(12) United States Patent
Mattingly et al.

(10) Patent No.: US 8,499,257 B2
(45) Date of Patent: Jul. 30, 2013

(54) HANDLES INTERACTIONS FOR HUMAN—COMPUTER INTERFACE

(75) Inventors: Andrew Mattingly, Kirkland, WA (US); Jeremy Hill, Seattle, WA (US); Arjun Dayal, Redmond, WA (US); Brian Kramp, Kirkland, WA (US); Ali Vassigh, Redmond, WA (US); Christian Klein, Duvall, WA (US); Adam Poulos, Redmond, WA (US); Alex Kipman, Redmond, WA (US); Jeffrey Margolis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 156 days.

(21) Appl. No.: 12/703,115

(22) Filed: Feb. 9, 2010

(65) Prior Publication Data

US 2011/0197161 A1 Aug. 11, 2011

(51) Int. Cl.
*G06F 3/14* (2006.01)
*G06F 3/17* (2006.01)

(52) U.S. Cl.
USPC ............ 715/810; 725/28; 725/37; 345/158; 345/633

(58) Field of Classification Search
USPC .......... 715/200–277, 700–867; 700/701–866; 709/201–229; 705/50–79; 345/30–111, 633; 345/158; 348/206–231.9; 707/200–206; 725/28, 725/37
See application file for complete search history.

(56) References Cited

U.S. PATENT DOCUMENTS

| | | | |
|---|---|---|---|
| 4,627,620 | A | 12/1986 | Yang |
| 4,630,910 | A | 12/1986 | Ross et al. |
| 4,645,458 | A | 2/1987 | Williams |
| 4,695,953 | A | 9/1987 | Blair et al. |
| 4,702,475 | A | 10/1987 | Elstein et al. |
| 4,711,543 | A | 12/1987 | Blair et al. |
| 4,751,642 | A | 6/1988 | Silva et al. |
| 4,796,997 | A | 1/1989 | Svetkoff et al. |
| 4,809,065 | A | 2/1989 | Harris et al. |
| 4,817,950 | A | 4/1989 | Goo |
| 4,843,568 | A | 6/1989 | Krueger et al. |
| 4,893,183 | A | 1/1990 | Nayar |
| 4,901,362 | A | 2/1990 | Terzian |
| 4,925,189 | A | 5/1990 | Braeunig |

(Continued)

FOREIGN PATENT DOCUMENTS

| | | |
|---|---|---|
| CN | 101254344 B | 6/2010 |
| EP | 0583061 A2 | 2/1994 |

(Continued)

OTHER PUBLICATIONS

Toyama, Kentaro, et al., "Probabilistic Tracking in a Metric Space," Eighth International Conference on Computer Vision, Vancouver, Canada, vol. 2, Jul. 2001, 8 pages.

(Continued)

*Primary Examiner* — Ruay Ho
(74) *Attorney, Agent, or Firm* — Vierra Magen Marcus LLP

(57) ABSTRACT

A system is disclosed for providing on-screen graphical handles to control interaction between a user and on-screen objects. A handle defines what actions a user may perform on the object, such as for example scrolling through a textual or graphical navigation menu. Affordances are provided to guide the user through the process of interacting with a handle.

13 Claims, 9 Drawing Sheets

U.S. PATENT DOCUMENTS

| | | |
|---|---|---|
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,404,416 B1 * | 6/2002 | Kahn et al. .................... 345/158 |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,000,200 B1 | 2/2006 | Martins |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,047,547 B2 * | 5/2006 | Alten et al. .................... 725/28 |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,353,082 B2 | 4/2008 | Pretlove et al. |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |

| | | | |
|---|---|---|---|
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2004/0189720 A1 | 9/2004 | Wilson et al. | |
| 2005/0285878 A1* | 12/2005 | Singh et al. | 345/633 |
| 2005/0289590 A1* | 12/2005 | Cheok et al. | 725/37 |
| 2008/0026838 A1 | 1/2008 | Dunstan et al. | |
| 2009/0031240 A1 | 1/2009 | Hildreth | |
| 2009/0074248 A1 | 3/2009 | Cohen et al. | |
| 2010/0020026 A1 | 1/2010 | Benko et al. | |

FOREIGN PATENT DOCUMENTS

| | | |
|---|---|---|
| JP | 08044490 A1 | 2/1996 |
| KR | 1020070019849 A | 2/2007 |
| WO | 93/10708 A1 | 6/1993 |
| WO | 97/17598 A1 | 5/1997 |
| WO | 99/44698 A1 | 9/1999 |

OTHER PUBLICATIONS

Kenji Oka et al., "Real-time Tracking of Multiple Fingertips and Gesture Recognition for Augmented Desk Interface Systems," Proceedings of the Fifth IEEE International Conference on Automatic Face and Gesture Recognition 2002 (RGR'02), http://ieeexplore.ieee.org//stamp/stamp.jsp?tp=&arnumber=01004191.

Sean White et al., "Visual Hints for Tangible Gestures in Augmented Reality," IEEE 2007, http://ieeexplore.ieee.org/stamp/stamp.jsp?arnumber=04538824.

Lucia Terrenghi, "Affordances for Direct Manipulation in Interactive Environments," CHI 2006, Apr. 22-27, 2006, Montreal, Canada, http://nvac.pnl.gov/ivitcmd_chi06/papers/terrenghi.pdf.

D. Brookshire Conner et al., "Three-Dimensional Widgets," Computer Science Dept., Brown University, 1992 http://research.microsoft.com/pubs/64331/workshop92-widgets.pdf.

Stephanie Houde, "Iterative design of an interface for easy 3-D direct manipulation," —CHI '92, May 3-7, 1992, http://delivery.acm.org/10.1145/150000/142772/p135-houde.pdf?key1=142772&key2=5606205621&coll=GUIDE&dl=GUIDE&CFID=75865318&CFTOKEN=12504860.

Frederik C. M. Kjeldsen, "Visual Interpretation of Hand Gestures as a Practical Interface Modality," Columbia University, 1997, http://researchweb.watson.ibm.com/ecvg/pubs/fcmk-phd.pdf.

Inernational Search Report and Written Opinion dated Sep. 27, 2011 in International Application No. PCT/US2011/024078.

English Abstract for Publication No. KR1020070019849 published Feb. 15, 2007.

Kanade et al., "A Stereo Machine for Video-rate Dense Depth Mapping and Its New Applications", IEEE Computer Society Conference on Computer Vision and Pattern Recognition, 1996, pp. 196-202, The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactiv Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions of Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

\* cited by examiner

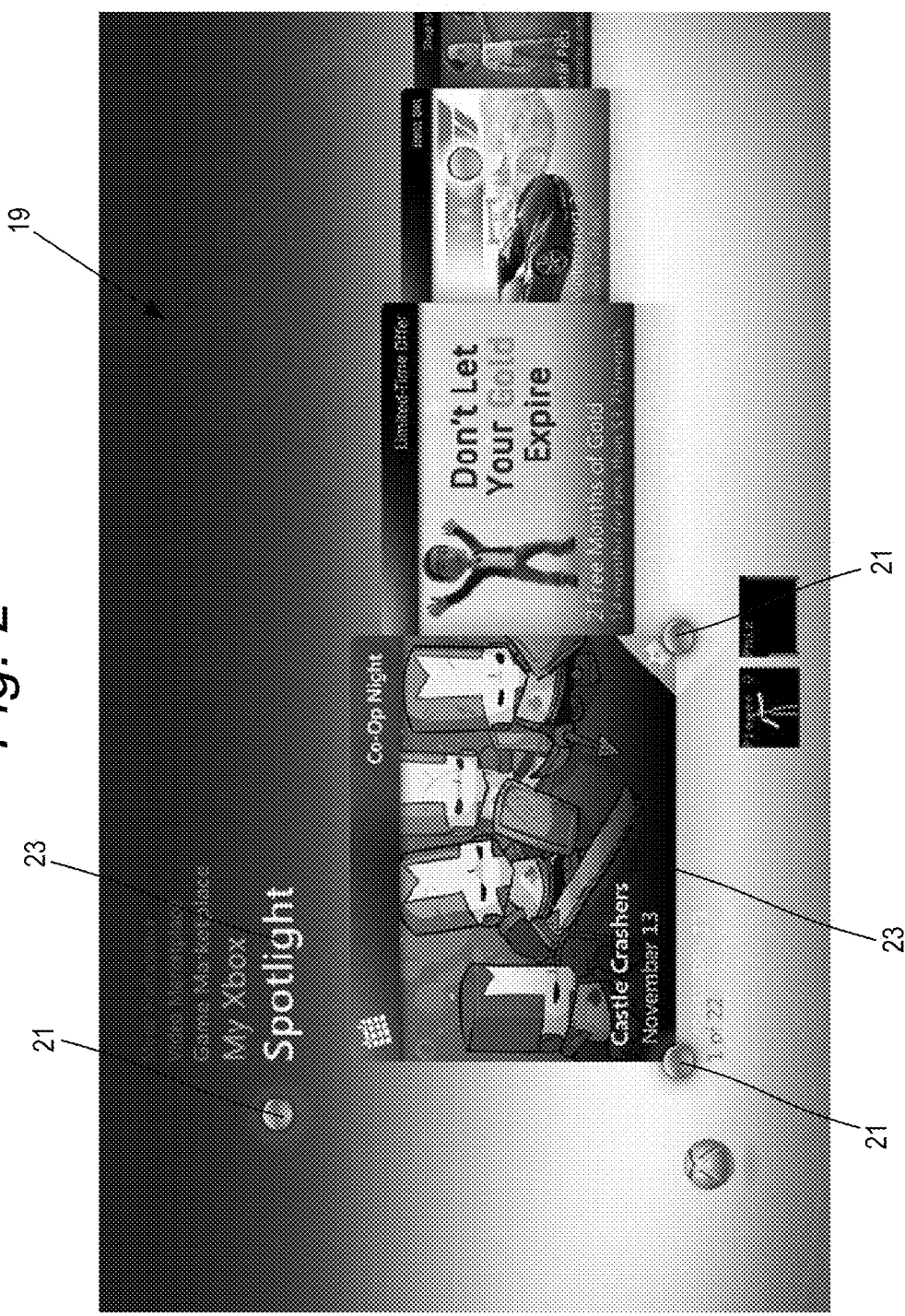

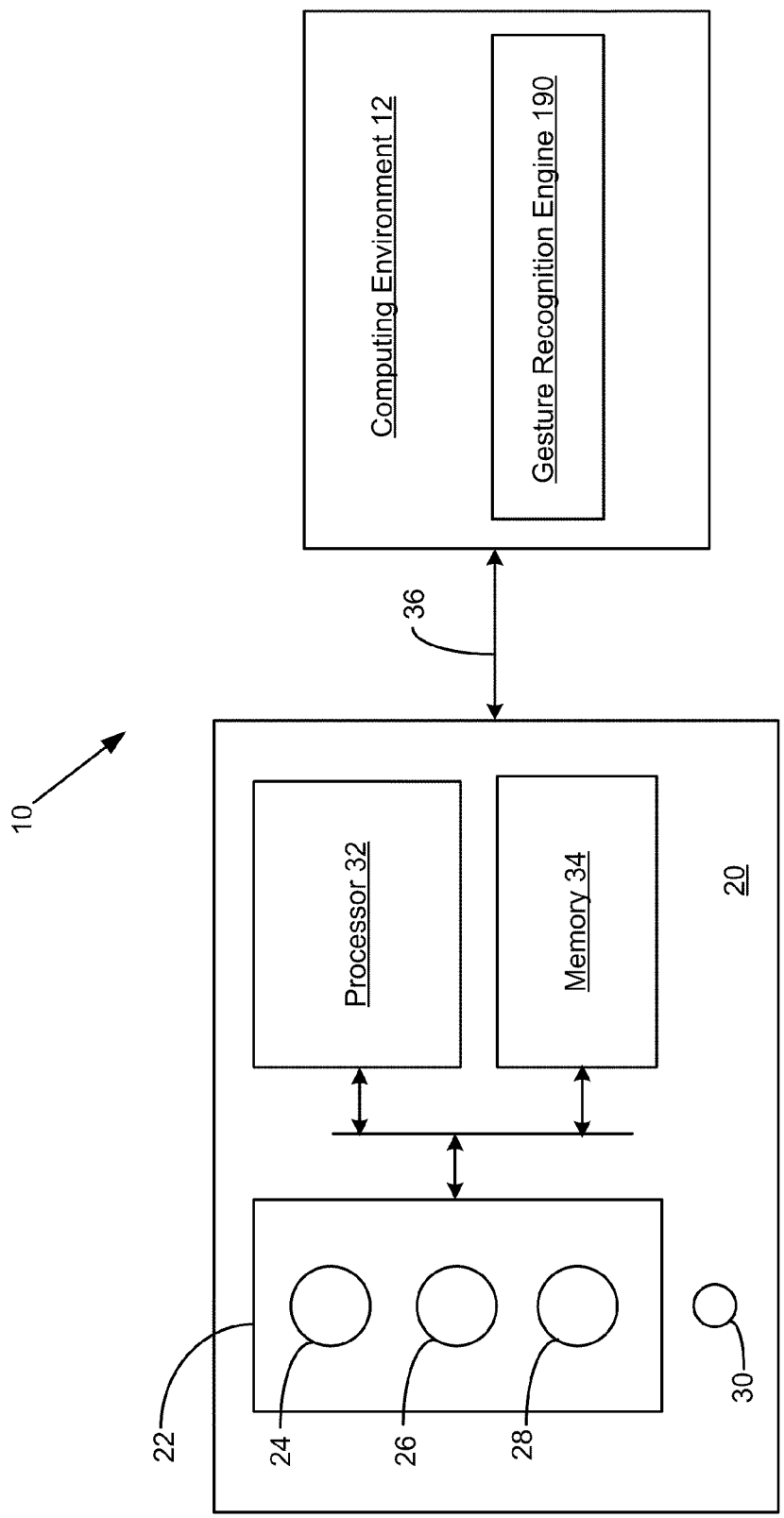

HANDLES INTERACTIONS FOR HUMAN—COMPUTER INTERFACE

BACKGROUND

In the past, computing applications such as computer games and multimedia applications used controllers, remotes, keyboards, mice, or the like to allow users to manipulate game characters or other aspects of an application. More recently, computer games and multimedia applications have begun employing cameras and software gesture recognition engines to provide a human computer interface ("HCI"). With HCI, user gestures are detected, interpreted and used to control game characters or other aspects of an application.

In HCI systems, hand gestures are often used to control interaction with a gaming or other application. Existing gesture recognition systems generally focus either on position-based pointing gestures or motion-based symbolic gestures. With pointing gestures, a user directs a cursor on the screen which follows the user's hand. Such gesture recognition systems have a variety of drawbacks, including jitter and latency (or lag time) between the hand movements and cursor position, and limited user interface (UI) density. With motion-based symbolic gestures, a user's movements are interpreted and, if matching a predefined gesture, some associated action is taken. Motion-based systems have certain drawbacks, including false positives, gesture collisions and the inability to provide immediate affordances and feedback (a particular gesture must first be recognized).

SUMMARY

The present technology in general relates to a system using on-screen graphical handles to control interaction between a user and on-screen objects. In embodiments, handles are UI objects displayed on the display in association with a given object. A handle defines what actions a user may perform on the object, such as for example, scrolling through a textual or graphical navigation menu. A user engages the handle and performs a gesture to manipulate the handle, such as for example, moving the handle up, down, left or right on the display screen. This manipulation results in an associated action being performed on the object. Affordances are provided to guide the user through the process of interacting with a handle.

In an embodiment, the present technology relates to a computing environment coupled to a capture device for capturing user position and providing a human-computer interface. This system performs a method of facilitating user interaction with an area of a display for the human-computer interface, including the steps of: (a) generating a handle associated with the area of the user interface; (b) detecting engagement by the user with the handle generated in said step (a); (c) receiving an indication of gesture by the user; and (d) performing an action on the area of the user interface in response to said step (c).

A further embodiment relates to a processor readable storage medium for a computing environment coupled to a capture device for capturing user position and providing a human-computer interface, the processor readable storage medium programming a processor to perform a method of facilitating user interaction with an action area of a display for the human-computer interface. This embodiment includes: (a) displaying on the display a graphical handle associated with the area of the user interface, the graphical handle providing an explicit engagement point for engaging the action area and the graphical handle defining how a user may interact with the action area upon receipt of a predefined gesture by the user; (b) receiving an indication that the user is tracking to the handle as a result of detecting user position; (c) establishing engagement with the handle when a user has tracked to the handle; (d) receiving an indication of gesture by the user; and (e) performing an action with respect to the action area of the display defined by the graphical handle where the gesture indication received in said step (d) matches the predefined gesture of said step (a).

A further embodiment relates to a human-computer interface, including: an action area on the display, the action area capable of at least one of performing an action and having an action performed on it; a handle displayed on the display and associated with the action area, the handle providing an explicit engagement point with an action area and defining how a user may interact with the action area; and rails displayed on the display associated with the handle for defining how a user may manipulate the handle.

BRIEF DESCRIPTION OF THE DRAWINGS

FIG. 2 illustrates a sample screen display including handles according to an embodiment of the present technology.

FIG. 3 illustrates an example embodiment of a capture device that may be used in a target recognition, analysis, and tracking system.

DETAILED DESCRIPTION

Embodiments of the present technology will now be described with reference to FIGS. 1-9, which in general relate to a gesture recognition and interaction system using on-screen handles to control interaction between a user and on-screen objects. In embodiments, handles are UI objects for interacting with, navigating about, and controlling a human-computer interface. In embodiments, a handle provides an explicit engagement point with an action area such as an object on the UI, and provides affordances as to how a user may interact with that object. Once a user has engaged a handle, the user may manipulate the handle, for example by moving the handle or performing one or more gestures associated with that handle.

Figure 1:
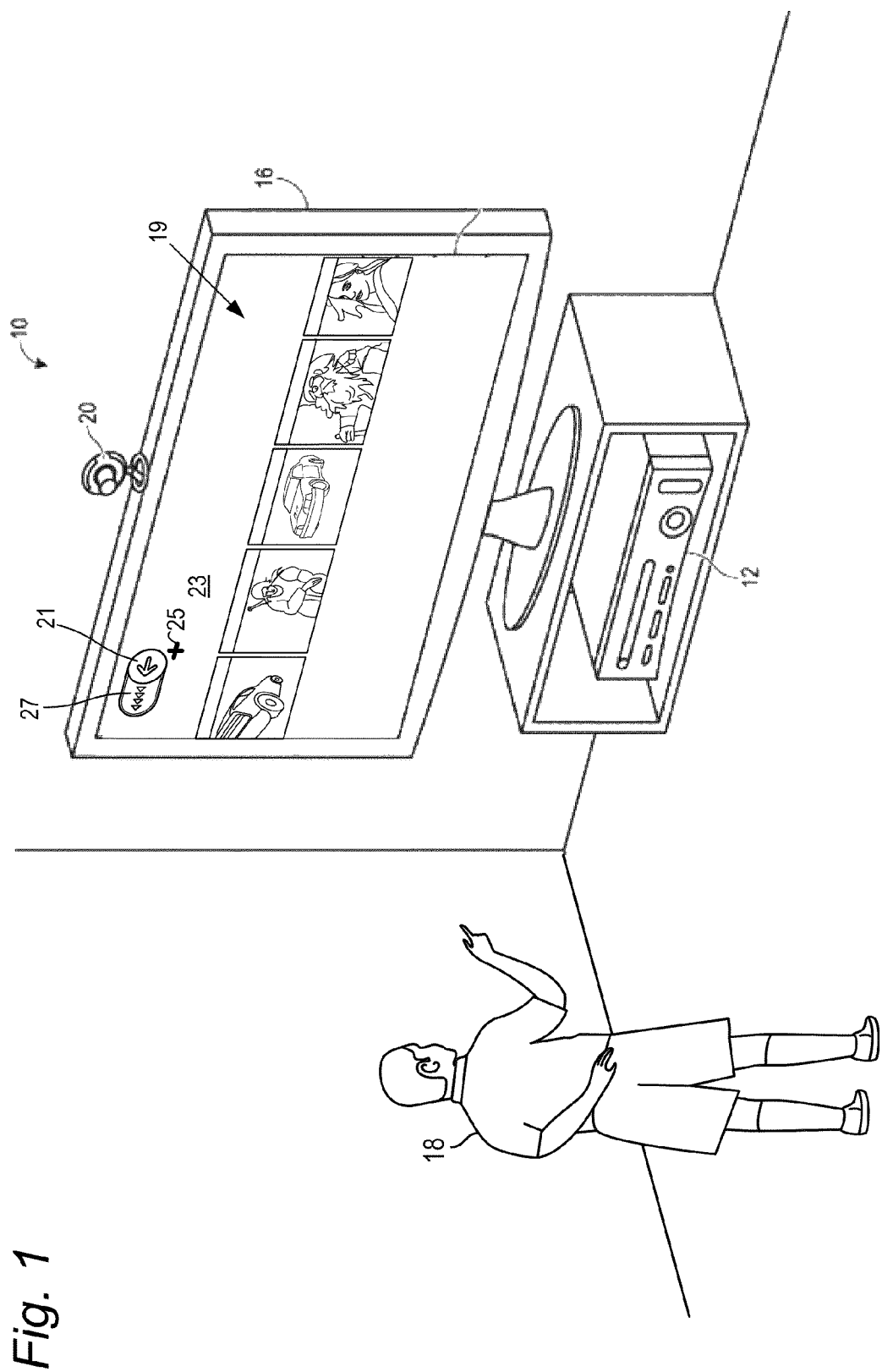
FIG. 1 illustrates an example embodiment of a target recognition, analysis, and tracking system with a user interacting with the system.

Referring initially to FIGS. 1-3, the hardware for implementing the present technology includes a target recognition, analysis, and tracking system 10 which may be used to recognize, analyze, and/or track a human target such as the user 18. Embodiments of the target recognition, analysis, and tracking system 10 include a computing environment 12 for executing a gaming or other application, and an audiovisual device 16 for providing audio and visual representations from the gaming or other application. The system 10 further includes a capture device 20 for capturing positions and movements performed by the user 18, which the computing environment 12 receives, interprets and uses to control the gaming or other application. Each of these components is explained in greater detail below.

As shown in FIG. 1, in an example embodiment, the application executing on the computing environment 12 may present a UI 19 to the user 18. The UI may be part of a gaming application or platform, and in embodiments may be a navigation menu for accessing selected areas of the gaming application or platform. The computing environment 12 generates one or more handles 21 on the UI 19, each tied to or otherwise associated with an action area 23 on the UI 19. Each handle is in general a graphical object displayed on screen for controlling operations with respect to its associated action area, as explained in greater detail below.

In embodiments, a handle 21 may be shaped as a circle or a three-dimensional sphere on the display, but those of skill in the art would appreciate that a handle may be any of a variety of other shapes in alternative embodiments. As explained below, the presence and appearance of a handle 21 may change, depending on whether a user is present, and depending on whether a user is engaging a handle. In embodiments, the shape of a handle may be the same in all action areas 23, but it is contemplated that different action areas have different shaped handles in further embodiments. While FIG. 1 shows a single handle 21, a UI 19 may include multiple handles 21, each associated with a different action area 23, as explained below.

An "action area" as used herein is any area on the UI 19 which may have a handle associated therewith, and which is capable of either performing an action upon manipulation of its handle, or which is capable of having an action performed on it upon manipulation of its handle. In embodiments, an action area 23 may be a text or graphical object displayed as part of a navigation menu. However, in embodiments, an action area 23 need not be part of a navigation menu, and need not be a specific displayed graphical object. An action area 23 may alternatively be an area of the UI which, when accessed through its handle, causes some action to be performed, either at that area or on the UI in general.

Where an action area is a specific graphical object on the display, a handle 21 associated with that graphical object may be displayed on the graphical object, or adjacent the graphical object, at any location around the periphery of the graphical object. In a further embodiment, the handle 21 may not be mapped to a specific object. In this embodiment, the action area 23 may be an area on the UI 19 including a number of graphical objects. When the handle 21 associated with that action area is manipulated, an action may be performed on all objects in that action area 23. In a further embodiment, the handle 21 may be integrated into a graphical object. In such an embodiment, there is no visual display of a handle 21 separate from the object. Rather, when the object is grasped or otherwise selected, the object acts as a handle 21, and the actions associated with a handle are performed. These actions are described in greater detail below.

The interface 19 may further include a cursor 25 that is controlled via user movements. In particular, the capture device 20 captures where the user is pointing, as explained below, and the computing environment interprets this image data to display the cursor 25 at the determined spot on the audiovisual device 16. The cursor may provide the user with closed-loop feedback as to where specifically on the audiovisual device 16 the user is pointing. This facilitates selection of handles on the audiovisual device 16 as explained hereinafter. Similarly, each handle may have an attractive force, analogous to a magnetic field, for drawing a cursor to a handle when the cursor is close enough to a handle. This feature is also explained in greater detail hereinafter. The cursor 25 may be visible all the time, only when a user is present in the field of view, or only when the user is tracking to a specific object on the display.

One purpose of a handle 21 is to provide an explicit engagement point from which a user is able to interact with an action area 23. In operation, a user would guide a cursor 25 over to a handle 21, and perform a gesture to attach to the handle. The three dimensional real space in which the user moves may be defined as a frame of reference in which the z-axis is an axis extending horizontally straight out from the capture device 20, the x-axis is a horizontal axis perpendicular to the z-axis, and the y-axis is a vertical axis perpendicular to the z-axis. Given this frame of reference, a user may attach to a handle by moving his or her hand in an x-y plane to position the cursor over a handle, and then moving that hand along the z-axis toward the capture device. Where a cursor is positioned over a handle, the computing environment 12 interprets the inward movement of the user's hand (i.e., along the z-axis, closer to an onscreen handle 21) as the user attempting to attach to a handle, and the computing environment performs this action. In embodiments, x-y movement onscreen is accomplished in a curved coordinate space. That is, the use's movements are still primarily in the x-direction and y-direction, but some amount of z-direction warping is factored in to account for the curved path a human arms follow.

There are different types of handles with varying methods of engagement. A first handle may be a single-handed handle. These types of handles may be engaged by either the user's right or left hand, but not both. A second type of handle may be a dual-handed handle. These types of handles are able to be engaged by a user's right hand or left hand. Separate instances of dual-handed handles may be created for right and left hand versions, and positioned to the left or right of an action area, so that the handle can be positioned for more natural engagement in 3D space for a user. A third type of handle is a two-handed paired handle. These handles require both of a user's hands to complete an interaction. These interactions utilize visual and, in embodiments, auditory affordances to inform a user how to complete the more complex interactions as explained below.

FIG. 1 includes an example of a single-handed handle 21. FIG. 2 is an illustration of a display including additional examples of handles. The handle 21 toward the top of the UI 19 in FIG. 2 is a single-handed handle 21 associated with an action area 23, which in this example is a textual navigation menu. The two handles 21 toward the bottom of the UI 19 are examples of dual-handed handles associated with an action area 23. In the example of FIG. 2, the action area 23 is one or more graphical navigation objects (also called "slots") showing particular software titles on which some action may be performed by a user selecting both handles 21 at lower corners of a slot.

Different handles 21 may also be capable of different movements when engaged by a user. For example, some handles are constrained to move in a single direction (e.g., along the x-axis or y-axis of the screen). Other handles are provided for two axis movement along the x-axis and the y-axis. Further handles are provided for multi-directional movement around an x-y plane. Still further handles may be moved along the z-axis, either exclusively or as part of a multi-dimensional motion. Each handle may include affordances for clearly indicating to users how a handle may be manipulated. For example, when a user approaches a handle 21, graphical indications referred to herein as "rails" may appear on the display adjacent a handle. The rails show the directions in which a handle 21 may be moved to accomplish some action on the associated action area 23. Rails are explained in greater detail below, but FIG. 1 shows a rail 27 which indicates that the handle 21 may be moved along the x-axis (to the left in FIG. 1). As indicated, rails only appear when a user approaches a handle 21 or engages a handle 21. Otherwise they are not visible on the screen so as not to clutter the display. However, in an alternative embodiment, any rails associated with a handle may be visible at all times its handle is visible.

In further embodiments, the cursor 25 may also provide feedback and cues as to the possible handle manipulations. That is, the position of cursor may cause rails to be revealed, or provide manipulation feedback, in addition to the handle itself.

FIG. 3 illustrates an example embodiment of the capture device 20 that may be used in the target recognition, analysis, and tracking system 10. Further details relating to a capture device for use with the present technology are set forth in copending patent application Ser. No. 12/475,308, entitled "Device For Identifying And Tracking Multiple Humans Over Time," which application is incorporated herein by reference in its entirety. However, in an example embodiment, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 3, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

As shown in FIG. 3, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

According to another embodiment, the capture device 20 may include two or more physically separated cameras that may view a scene from different angles, to obtain visual stereo data that may be resolved to generate depth information.

The capture device 20 may further include a microphone 30. The microphone 30 may include a transducer or sensor that may receive and convert sound into an electrical signal. According to one embodiment, the microphone 30 may be used to reduce feedback between the capture device 20 and the computing environment 12 in the target recognition, analysis, and tracking system 10. Additionally, the microphone 30 may be used to receive audio signals that may also be provided by the user to control applications such as game applications, non-game applications, or the like that may be executed by the computing environment 12.

In an example embodiment, the capture device 20 may further include a processor 32 that may be in operative communication with the image camera component 22. The processor 32 may include a standardized processor, a specialized processor, a microprocessor, or the like that may execute instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information. According to an example embodiment, the memory component 34 may include random access memory (RAM), read only memory (ROM), cache, Flash memory, a hard disk, or any other suitable storage component. As shown in FIG. 3, in one embodiment, the memory component 34 may be a separate component in communication with the image camera component 22 and the processor 32. According to another embodiment, the memory component 34 may be integrated into the processor 32 and/or the image camera component 22.

As shown in FIG. 3, the capture device 20 may be in communication with the computing environment 12 via a communication link 36. The communication link 36 may be a wired connection including, for example, a USB connection, a Firewire connection, an Ethernet cable connection, or the like and/or a wireless connection such as a wireless 802.11b, g, a, or n connection. According to one embodiment, the computing environment 12 may provide a clock to the capture device 20 that may be used to determine when to capture, for example, a scene via the communication link 36.

Additionally, the capture device 20 may provide the depth information and images captured by, for example, the 3-D camera 26 and/or the RGB camera 28, and a skeletal model that may be generated by the capture device 20 to the computing environment 12 via the communication link 36. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person.

The skeletal model may then be provided to the computing environment 12 such that the computing environment may track the skeletal model so as to identify for example where the user is pointing and what motions the user is performing. As explained below, a user may interact with the UI 19 through interaction with the handles 21 and performance of certain predefined gestures. Computing environment 12 may further include a gesture recognition engine 190 for recognizing these predefined gestures from the user 18. Further details of gesture recognition engine 190 are provided below.

Figure 4A:
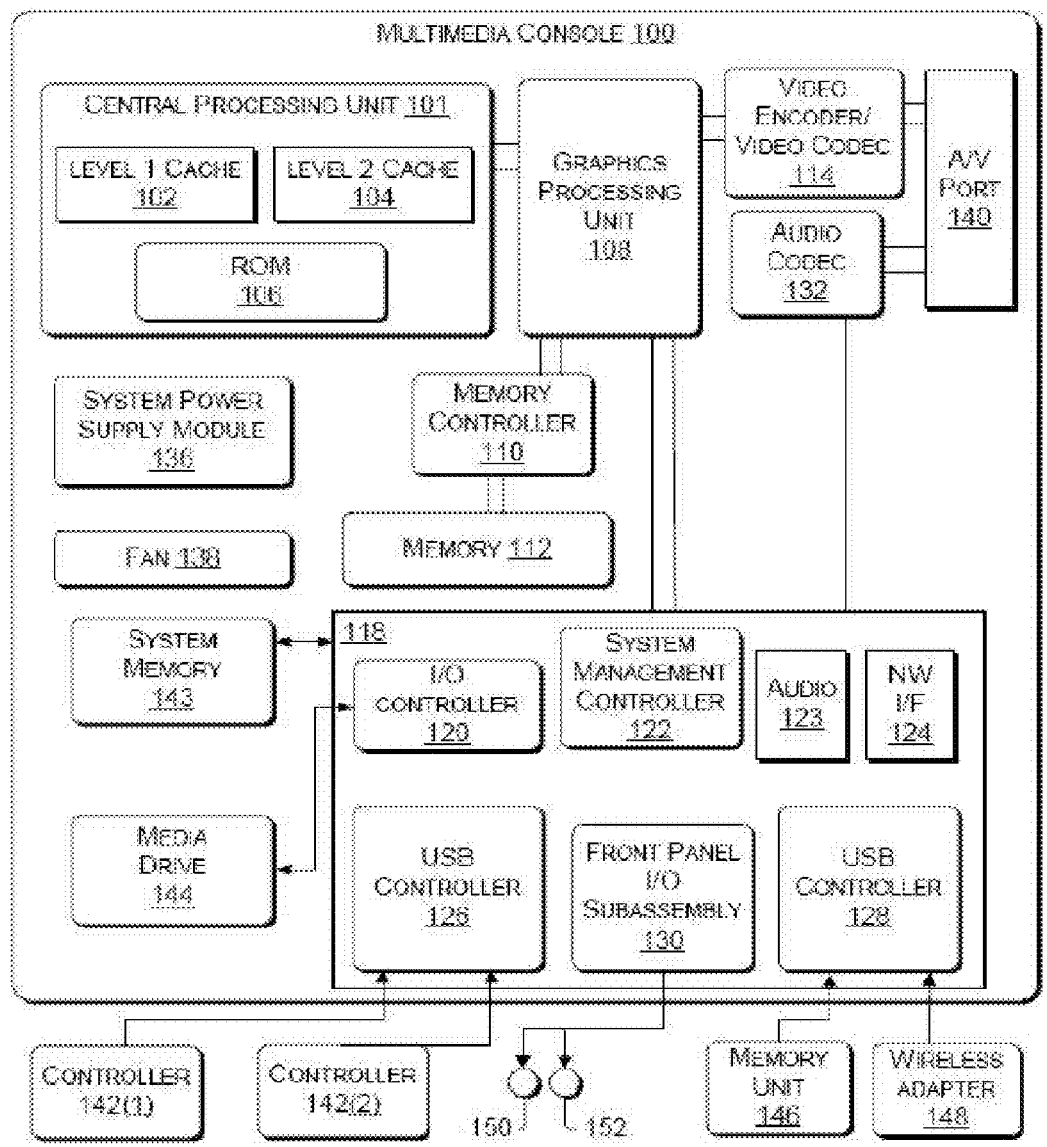
FIG. 4A illustrates an example embodiment of a computing environment that may be used in the target recognition, analysis, and tracking system of the present technology.

FIG. 4A illustrates an example embodiment of a computing environment that may be used to interpret user interaction with handles 21 and for recognizing one or more gestures. The computing environment such as the computing environment 12 described above with respect to FIGS. 1 and 3 may be a multimedia console 100, such as a gaming console. As shown in FIG. 4A, the multimedia console 100 has a central processing unit (CPU) 101 having a level 1 cache 102, a level 2 cache 104, and a flash ROM 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the GPU 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM.

The multimedia console 100 includes an I/O controller 120, a system management controller 122, an audio processing unit 123, a network interface controller 124, a first USB host controller 126, a second USB host controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 100.

Figure 4B:
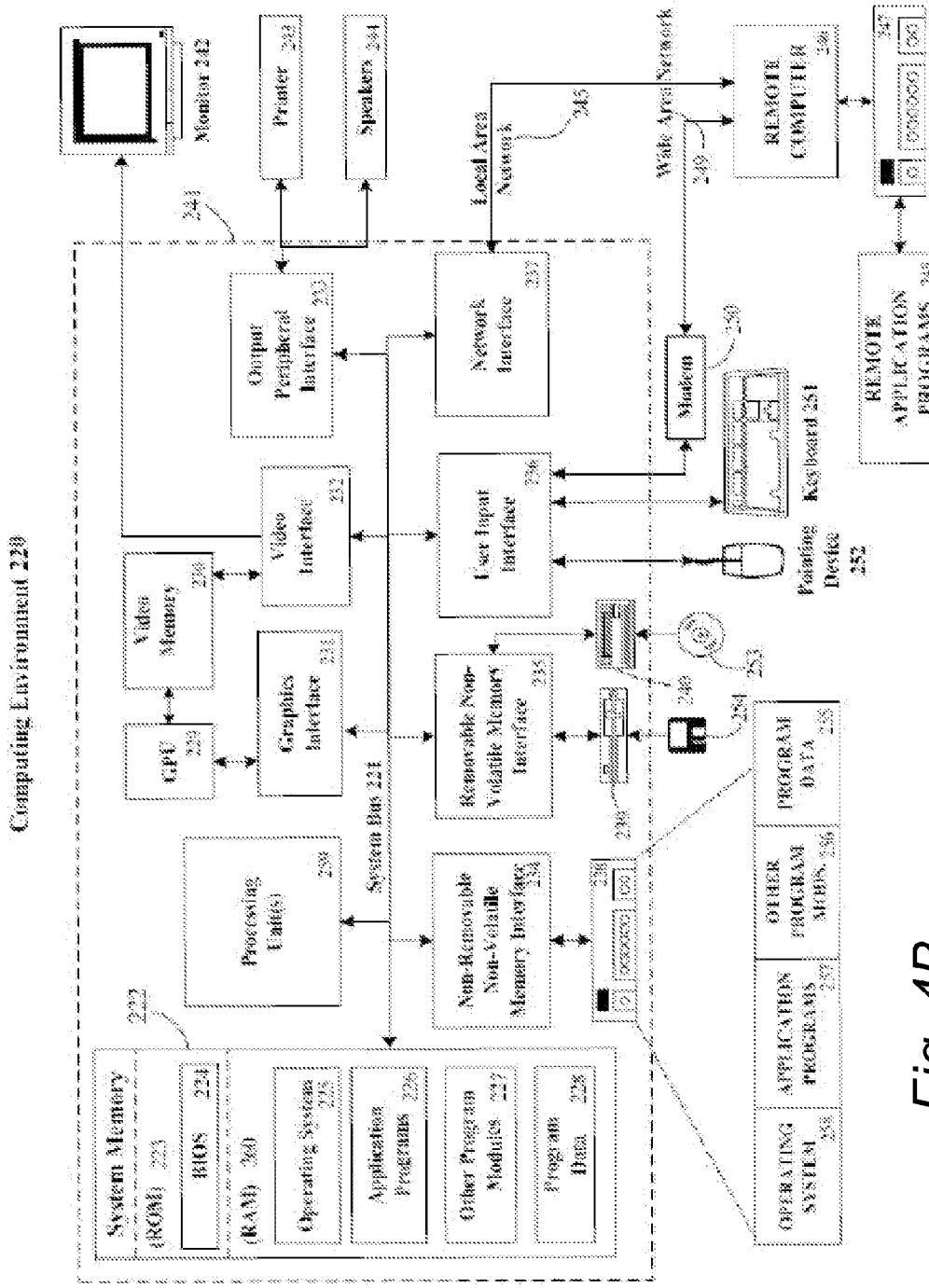
FIG. 4B illustrates another example embodiment of a computing environment that may be used in the target recognition, analysis, and tracking system of the present technology.

FIG. 4B illustrates another example embodiment of a computing environment 220 that may be the computing environment 12 shown in FIGS. 1 and 3 used to interpret user interaction with handles 21 and interpret one or more gestures in system 10. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 4B, the computing environment 220 comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4B illustrates operating system 225, application programs 226, other program modules 227, and program data 228. FIG. 4B further includes a graphics processor unit (GPU) 229 having an associated video memory 230. The GPU 229 may be connected to the system bus 221 through a graphics interface 231. A video memory 230 is further provided for use by the GPU 229 and video interface 232.

The computer 241 may also include other removable/non-removable, volatile/nonvolatile computer storage media. By way of example only, FIG. 4B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4B, provide storage of computer readable instructions, data structures, program modules and other data for the computer 241. In FIG. 4B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4B. The logical connections depicted in FIG. 4B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4B illustrates remote application programs 248 as residing on memory device 247. It will be appreciated that the network connections shown are exemplary and other means of establishing a communications link between the computers may be used.

An embodiment of the present technology will now be described with reference to the flowchart of FIG. 5. The following steps may be performed by processor 101 (FIG. 4A) or 299 (FIG. 4B) associated with the computing environment 12. In step 300, the system tracks a user entering the field of view of capture device 20. As indicated above, device 20 is capable of tracking users in the field of view and generating a skeletal model of their movement. In step 304, the system detects engagement by the user with the system. In embodiments, such engagement may be detected by the user lifting one or both hands into an area referred to herein as a physical interaction zone. The physical interaction zone is an area in the physical space of the user 18 from which the user is most likely interacting with the UI 19.

However, in embodiments, the system may analyze a variety of factors when determining whether a user is engaging with the system 10. The factors taken together may result in a confidence level, and the system detects engagement when the confidence level is above some predetermined threshold. These factors may include the user's body movement (moving the entire body vs. only the hands decreases confidence); the user's body orientation (facing the camera increases confidence); which hand is in the physical interaction zone (hand on the user's side facing the camera increases confidence); and how and when the user last disengaged (increased time decreases confidence). This confidence level may be accumulated over time, and the system detects engagement when the confidence level sum exceeds some established threshold.

In the brief period of time while the user is attempting to engage but the confidence has not yet reached this threshold, real-time feedback (e.g., a cursor gradually appearing) may be provided to indicate that the system is recognizing the user but is not yet granting gesture control.

After engagement has been established, the system detects a user tracking to a target UI object in step 306. In particular, the system senses the user is pointing at a target UI object. The UI object in embodiments may be a handle 21. The system may rely on the user to accomplish the proper pointing motion to center the cursor 25 over the target handle 21. In further embodiments, the handle 21 may have, in effect, an attractive force. Thus, based on factors including the proximity of the cursor 25 to a handle 21, the computing environment may pull the cursor to the handle 21, thus providing a margin of error with respect to how accurate a user needs to be in positioning the cursor 25 right on the handle 21. In an alternative embodiment, the attractive force may not affect the position of the cursor. Instead, if the cursor has satisfied the one or more criteria explained below, the cursor may instead demonstrate properties as if it was hovering over a handle. For example, the appearance of the handle and/or cursor may change, and visual affordances and feedback may be displayed to a user showing the user how he or she can interact with a handle.

Figure 6:
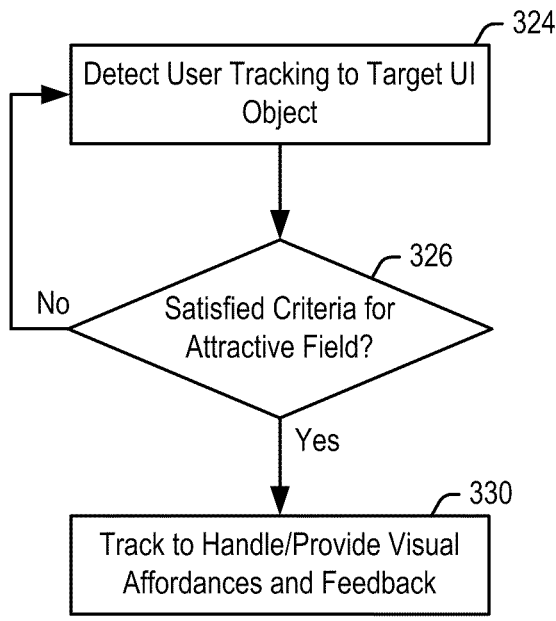
FIG. 6 is a flowchart of the operation of a handle to attract a cursor.

FIG. 6 shows an embodiment where an attractive force is simulated around a handle 21. In such embodiments, in step 324, the system detects a user tracking to the target handle. In step 326, the system determines whether the cursor 25 has satisfied the criteria for being pulled to and centered over the handle 21. If the cursor satisfies the criteria of step 326, it may be centered and lightly held over the target object in step 330 (lightly held meaning a more significant hand movement is required to move the cursor than would be required to move the cursor were it not centered over the handle). At that point, the appearance of the handle and/or cursor may also change to indicate activation of the handle, and visual affordances and feedback may be displayed to the user. Alternatively, as explained above, the position of the cursor may remain unchanged, but handle may activate and the visual affordances and feedback may be provided.

The criteria applied in step 326 as to whether a cursor 25 gets captured in the attractive force of a handle 21 may include proximity of the cursor 25 to the handle 21, so that the closer it is, the more likely it is that it will be pulled to the handle. The criteria may include a change in the depth of the user's pointing hand relative to his or her body, so that movement closer to the capture device 20 makes it more likely that the cursor will be pulled to the handle. And the criteria may include the time spent close to the handle, with more time spent close to the handle makes it more likely that the cursor will be pulled to the handle. Other criteria may be applied in further embodiments. In embodiments, the cursor 25 maintains its shape as it is pulled to a handle. In further embodiments, the cursor 25 may or may not be pulled to a handle, but the cursor may morph or change shape to indicate its engagement with the handle.

Returning to FIG. 5, once a user has tracked to a target handle, the system detects a user attaching to the target handle in step 308. As indicated above, where a cursor is positioned over a handle, the computing environment 12 may then sense attaching to the object where the user moves his or her hand closer along the z-axis. Alternatively or additionally, the user may perform an attaching motion (moving the fingers from an open to closed position), which gesture is interpreted as the user attaching to the object over which the cursor is centered. Further methods of sensing a user's desire to engage with a handle include defining a specific hot spot within the zone of physical activity, where the user knows to place his or her hand to attach to a handle and to simply hover over an object for a predetermined period of time. Other methods of sensing a user's desire to engage with a handle may be provided in further embodiments.

Figure 8:
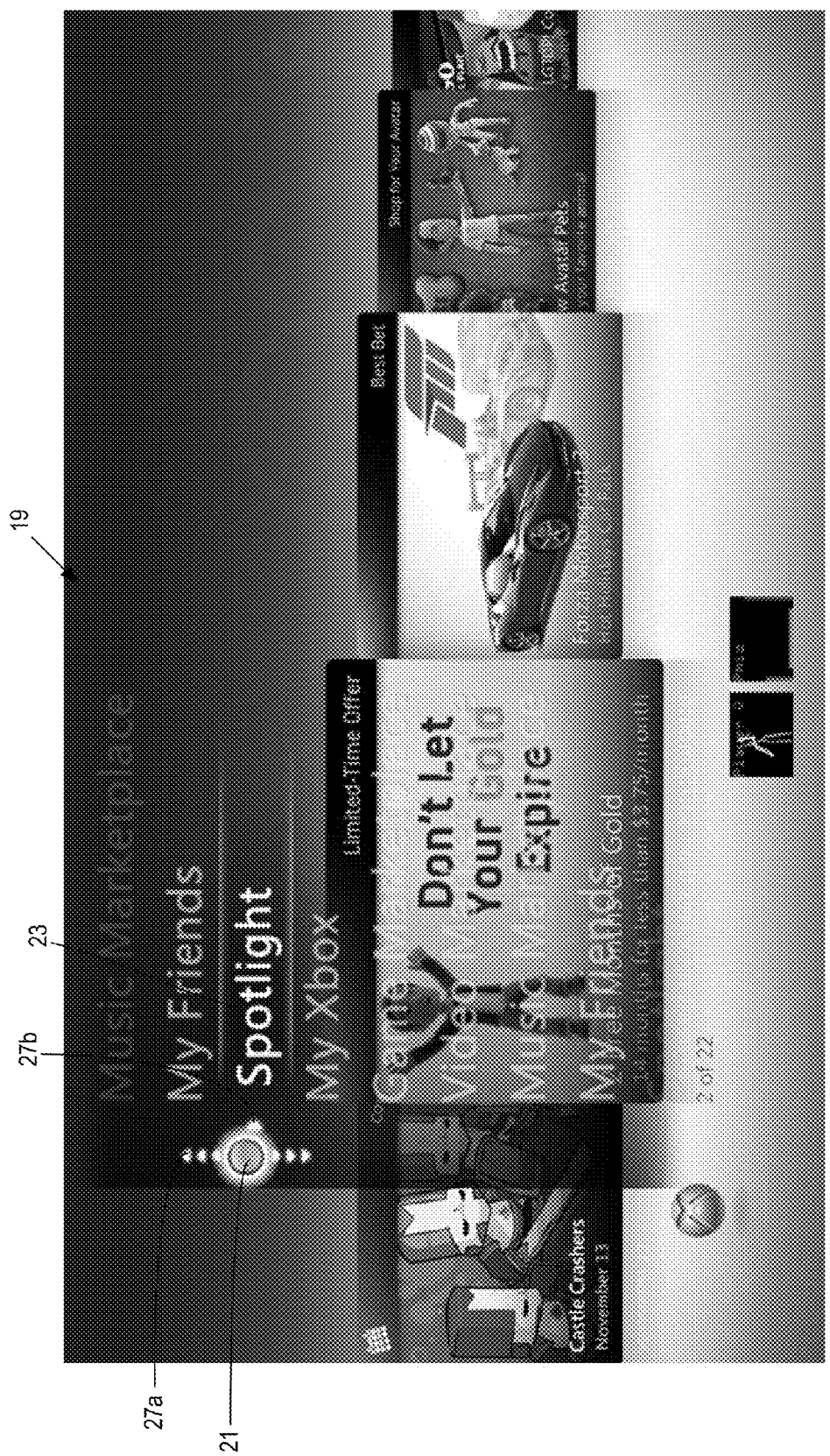
FIG. 8 illustrates a sample screen display including handles and rails according to an embodiment of the present technology.
Figure 9:
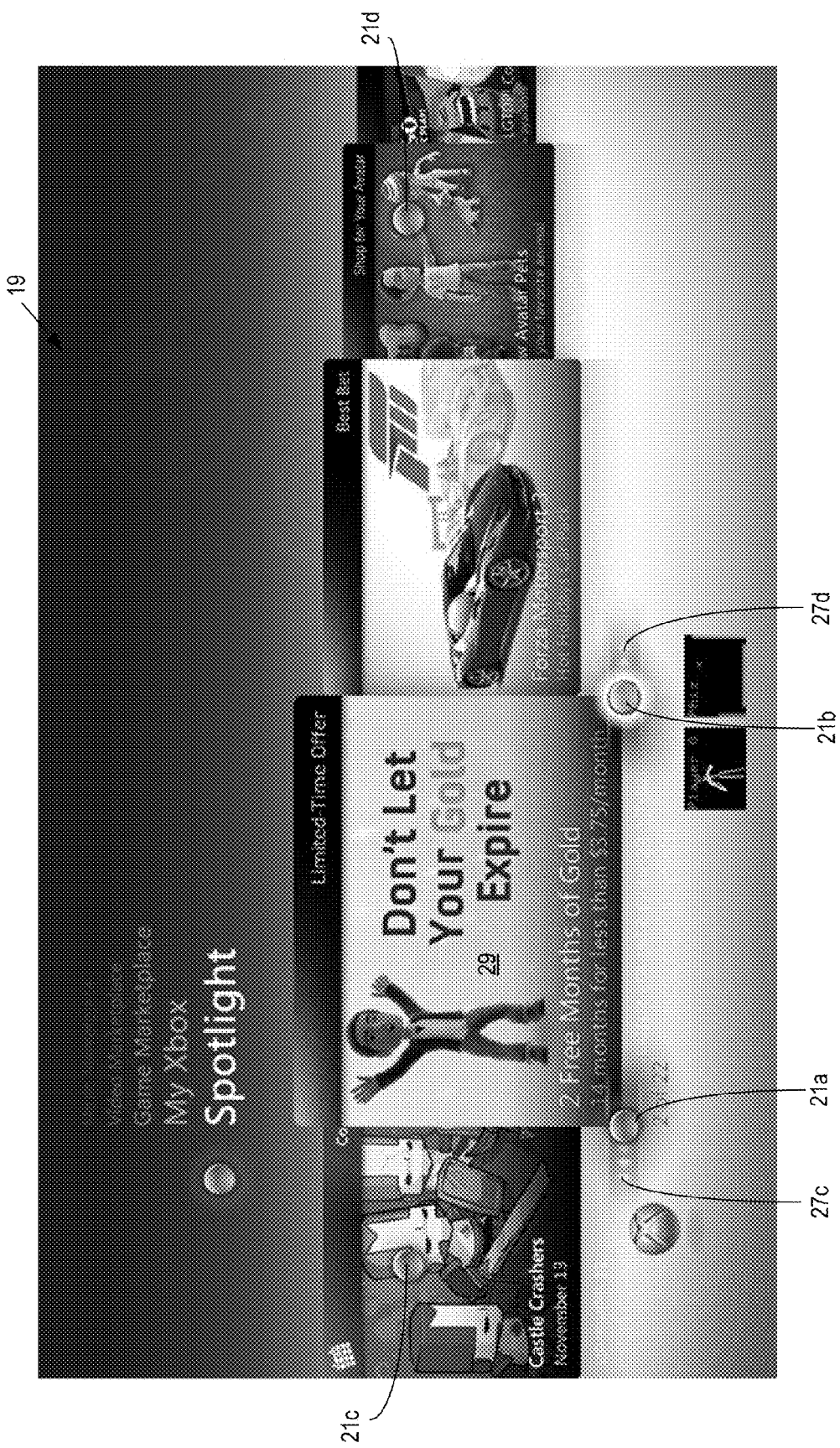
FIG. 9 illustrates a sample screen display including handles and rails according to a further embodiment of the present technology.

Once a user has attached to a handle (or alternatively, when the cursor is near), the system may display the affordances for that handle 21 in step 310. Handles 21 may include a wide variety of affordances, some are shown in FIG. 1 and FIGS. 8 through 9. In FIG. 1, the affordance is a rail 27 which shows that the user may grasp the handle, and slide it to the left (from the perspective of FIG. 1). This is accomplished by the user moving his or her hand to the left once the handle 21 is grasped. Once a handle is grasped, the length by which a handle moves for a given hand movement may be the same ratio as for moving other objects on the display, less sensitive (i.e., the handle moves less for a given hand movement) or more sensitive (i.e., the handle moves more for a given hand movement).

Rails 27 in general are graphical objects displayed in association with a given handle 21 once a user attaches or nearly attaches to that handle, which show the user how that handle may be manipulated. The rails may have arrows to make clear the motions which may be carried out on the handle. In embodiments, rails 27 may be horizontal and/or vertical, to show that an associated handle may be manipulated horizontally and/or vertically. Rails 27 need not be horizontal or vertical in further examples. For instance, a rail may show that the user can move a handle diagonally, or generally within the x-y plane. A rail 27 may further show that a handle may be manipulated in a non-linear direction, such as for example, in a circular motion.

FIG. 8 shows the screen illustration of FIG. 2, but at a later time when a user has attached to the handle 21 near the top of the screen. As such, rails 27a and 27b are displayed to the user. The rail 27a shows that the user can move the handle up or down. The action associated with such manipulation of handle 21 would be to scroll the text menu in the action area 23 up or down. The rail 27b shows that the user can move the handle to the right (from the perspective of FIG. 8). The action associated with such a manipulation of handle 21 would be to scroll in the action area 23 to a sub-topic of the menu item at which the handle is then located. Once scrolled to a sub-topic, a new horizontal rail may appear to show the user that he or she can move the handle to the left (from the perspective of FIG. 8) to return to the next higher menu.

FIG. 9 shows the screen illustration of FIG. 2, but at a later time when a user has attached to the handles 21a, 21b near the bottom of the screen. As such, rails 27c and 27d are displayed to the user. The handles 21a, 21b and rails 27c, 27d displayed together at corners of a slot show that the user can select that slot with two hands (one on either handle). FIG. 9 further shows handles 21c and 21d toward either side of the UI 19. Engagement and movement of the handle 21c to the left (from the perspective of FIG. 9) accomplishes the action of scrolling through the slots 29 to the left. Engagement and movement of the handle 21d to the right (from the perspective of FIG. 9) accomplishes the action of scrolling through the slots 29 to the right.

Figure 5:
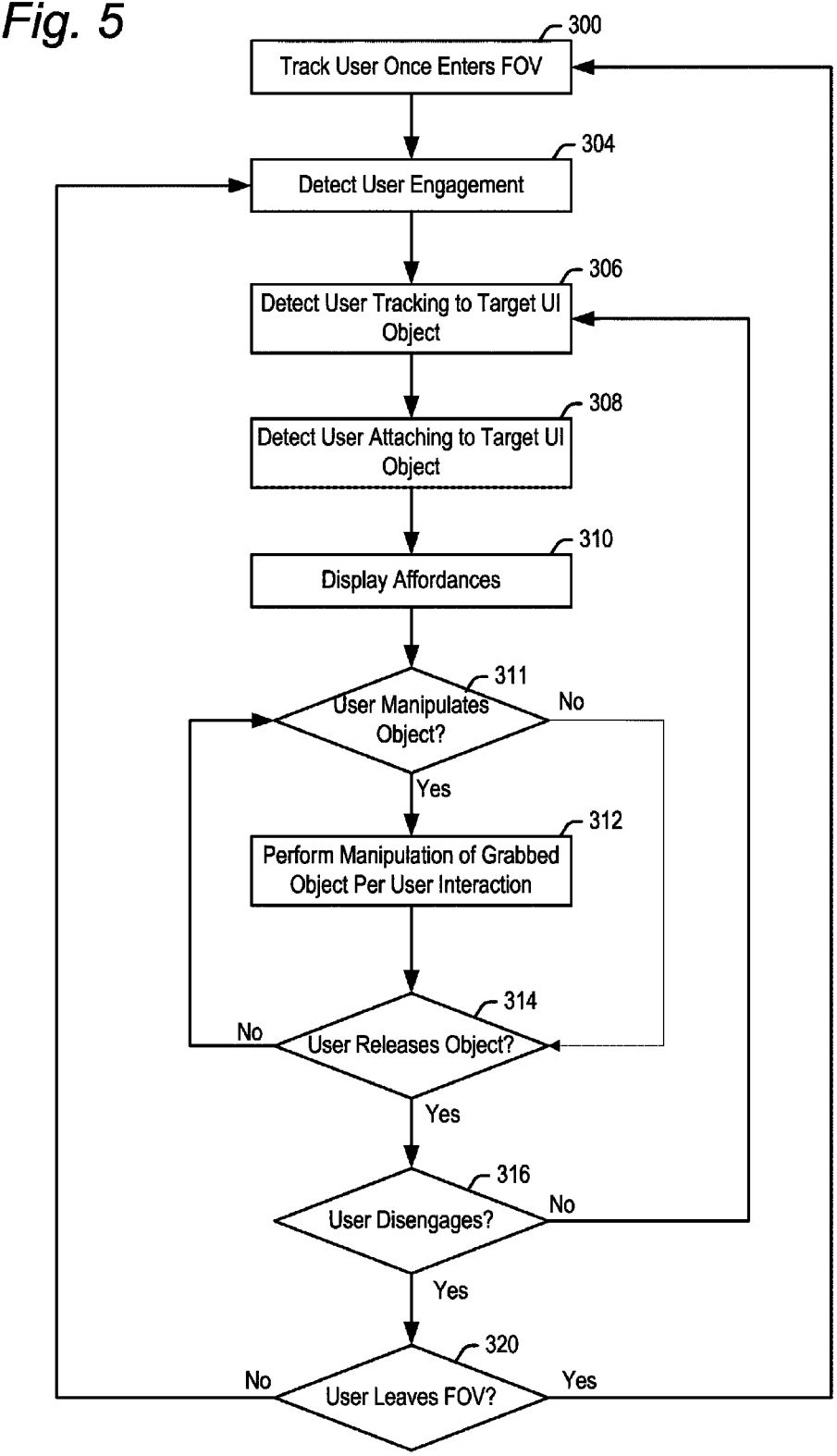
FIG. 5 is a flowchart of the operation of an embodiment of the present technology.

Returning to the flowchart of FIG. 5, after a user attaches to a handle and has been shown the affordances, a user may manipulate a handle in step 311 or decide to release the object in step 314. If a user chooses to manipulate an object in step 311, the manipulation is performed in step 312. Some manipulations of handles 21, and the associated actions, have been explained above with respect to FIGS. 8 and 9. However, in general, a manipulation of a handle 21 may involve sliding a handle along the x-axis and/or y-axis, pulling the handle along the z-axis, cranking the handle in a circular motion, or using the handle as a joystick in an x-y plane. Specific handles for performing specific actions are explained below.

Figure 7:
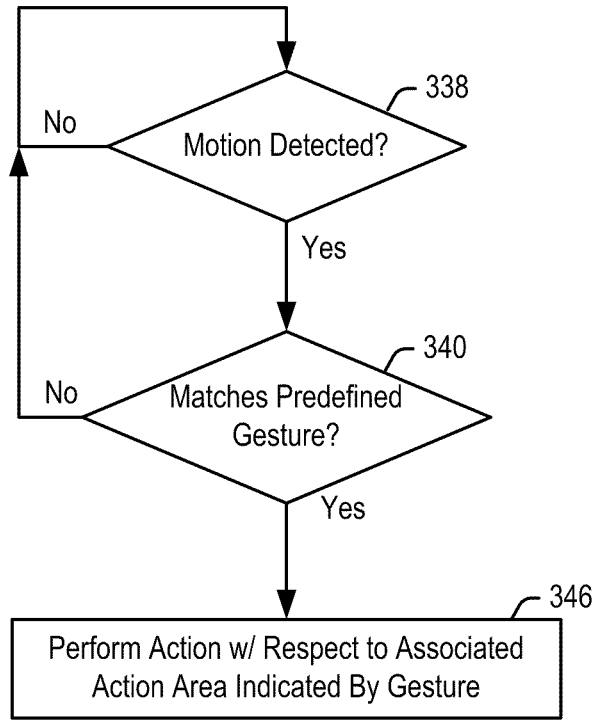
FIG. 7 is a flowchart of the operation of the present system to recognize a gesture.

Manipulation of a handle 21 will now be explained in greater detail with respect to the flowchart of FIG. 7. In step 338, the system may look for movement of a user once the user has attached to particular handle. If motion is detected in step 338, the system looks for a predefined gesture that matches the motion performed by the user in step 340. If such a predefined gesture is found that is allowed by the handle, that action is performed with respect to the associated action area 23 in step 346. One advantage of using handles, is that only certain predefined gestures will be applicable to that handle. Thus, while there may be a wide variety of gestures known to the computing environment 12 as explained below, the number of predefined gestures that the computing environment 12 need be concerned with is narrowed depending on the particular handle 21 that is selected.

Those of skill in the art will understand a variety of methods of analyzing user position and movement to determine whether the user's positions and/or movements conform to a predefined gesture. Such methods are disclosed for example in the above incorporated application Ser. No. 12/475,308, as well as U.S. Patent Application Publication No. 2009/0074248, entitled "Gesture-Controlled Interfaces For Self-Service Machines And Other Applications," which publication is incorporated by reference herein in its entirety. However, in general, user positions and movements are detected by the capture device 20. From this data, various parameters relating to the positions/movement of each body part may be collected and forwarded to a gesture recognition engine within computing environment 12. The gesture recognition engine 190 compares the position/movement parameters against a library of stored gestures to determine if there is a match above a threshold confidence level. If so, the user is said to have performed the matched gesture and the associated action is taken.

In addition to significantly reducing the number of stored gestures that the gesture recognition engine need look through, using handles to engage objects also significantly reduces the risk of false positives and false negatives as to whether a given gesture was performed. In particular, by limiting the set of possible gestures which may be performed for a given handle 21, other gestures which may have been mistakenly identified are not examined.

As indicated above, handles 21 may be broadly classified as belonging to one of a few groups defining how a handle may be engaged. That is, a handle may either be a single-handed handle, a dual-handed handle or a two-handed paired handle. However, handles 21 may further be broken down into the particular type of action that they cause to be performed on or by their associated action area 23. That is, a particular handle or handles are assigned to a particular action area based on the actions that the action area can perform and on the actions that can be performed on the action area. Thus, for example where an action area is meant to scroll up, down or to the sides, that action area would be assigned a handle which specifically recognizes gestures that perform those actions, i.e., moving a user's hand up, down or to the sides while a user is attached to that handle. The following are some gestures which may be in the set of gestures recognized for a given handle. The following is not intended as an exclusive listing of all possible gestures which may be applied to a given handle.

Most often, a gesture required so that an action is performed on or by an action area 23 is no more than moving a handle 21 along one of its rails. The user motion to perform this will simply be moving his or her hand along the direction of the rail while a user is attached to a handle. However, it is conceivable that other gestures may be recognized for a given handle that do not simply involve sliding a handle along its rails. The following describe a number of handle names, which names describe the action that is performed on or by the action item associated with the handle.

Crank handles—A user engages with the crank handle and is able to perform circular gestures in either of the three planes (x-y, y-z and x-z) depending on the particular action area to which it is applied. This handle can be used for slot or list navigation and can be tuned for fine grain control or accelerated control by mapping objects to points on a circle.

Slider handles (one and two way)—A single dimension handle that can be manipulated in one or two directions, as indicated by the associated rails. The back handle, shown in FIG. 1, is an example of a single direction slider handle, while a list scroller slider handle, shown for example in FIG. 9, is an example of a bidirectional slider handle.

Virtual joystick handle—A multi-dimensional and multi-directional handle that can mimic the controller D-pad states and be used for UI navigation. The user may or may not travel through the neutral center point before transitioning from one state to the next.

Drop down menu handle—A partially on screen handle that reveals additional UI when it is engaged. This may for example be used to bring up a quick launch panel of items to select from.

Context menu handle (also referred to as a Marking menu handle)—A handle brought up by engaging with an object in an action area and pulling it in one of three directions (up, left, or right). A user may disengage from this handle, as explained below, by moving in the downward direction.

Button handle—A simple handle attached to an object that only requires a user to select the handle by engaging with it for an action to be performed. A subsequent rail or user manipulation is not necessary to complete the interaction.

Drag and drop (free form) handle—A handle whose position on-screen and in 3D space is able to be changed by engaging and manipulating the handle visual to a new location.

Peel (back & slot) handle—An integrated handle that can be part of an object or the background scene of display UI 19. Direct interaction and manipulation of this handle can reveal a previous scene or display (in the case of back navigation), or additional data for an object such as a slot.

Two-handed pull apart handles—A mechanism for select that requires both hands be engaged. After a user engages one of the handles, feedback is provided to alert him to engage with the second hand. Once both hands are engaged, the gesture is completed by pulling apart both hands until the end of both rails is reached.

Two-handed flip handles—A handle which again requires both hands to be engaged, but the gesture is performed by moving both hands towards one another. The visual rails and analog movement of the slot informs the user how close he is to completing the gesture.

Scrub handle—A handle that enables direct manipulation of a list of items after it has been engaged. This allows for more fine grained manipulation of a smaller number of content items.

Gear shift handle—A multi-dimensional, multi-directional handle similar to a virtual joystick, except that the gear shift handle is intended to support multiple parallel secondary directions each perpendicular to a primary direction (as in the shape of the letter 'E').

Ratchet handle—A handle similar to a slider, except that it allows for repeated motion along a track without disengaging.

Given the above disclosure, those of skill in the art will appreciate additional handles which may be used to perform additional actions with respect to an action area object or background.

Referring again to FIG. 5, after a user has manipulated a handle to achieve a given action (or if a user has decided not to manipulate the object in step 311), the user may release the handle in step 314. In embodiments, a handle may automatically be released upon completion of a gesture. Release of an object may alternatively be indicated by some manual action by the user to the system. Such manual actions include moving a user's hand further away along the z-axis, moving to or out of a specific hot spot in the zone of physical interactivity, moving a user's hand a specific distance or in an unsupported direction, or some other user motion.

In embodiments, the simulated attractive force may cause the user to perform a greater motion to detach from the handle than would otherwise be required to release other objects not having the simulated attractive force. If no release is detected, the system looks for further object manipulation again in step 312.

If a user releases an object in step 314, the system looks whether a user is disengaging from interaction in step 316, such as for example by dropping their hands. If no such disengagement is detected, the system returns to step 306 to look for tracking to an object (which may be the same or different than the previously attached object).

If a user disengages in step 316, the system checks whether the user leaves the field of view in step 320. If not, the system returns to step 304 to detect further user engagement. If, on the other hand, a user leaves the field of view, the system returns to step 300 to track when a user once again enters the field of view.

In embodiments, the appearance of a handle 21 may vary, depending on where the user is at in the flowchart of FIG. 5. While there is no user in the field of view, none of the handles may be visible. Once a user is detected in the field of view, the handles may be displayed. They may initially be displayed with a glow to alert the user as to which locations on the UI 19 have handles 21. Thereafter, a handle may remain neutral until a user approaches it, at which time it may glow to show recognition of the approach. Thereafter, the appearance of the handle may change once the user hovers over it, it may change again once the user attempts to attach to it, it may change again after a user has attached to it, and it may change again once a user manipulates it. Some or all of these changes may be omitted in further embodiments.

Given the above description, the present technology provides a system allowing easy interaction with on-screen objects and action areas in a human-computer interface system. The explicit engagement point provided by the handles, and the narrowing of the gestures which may then be applied, provides a highly reliable system with low false positives and negatives. The system is also easy to use. The clear affordances show what can be attached to and how and what can be done with a handle once attached to it. The interactions are easy to remember and easy to perform. The interaction is also consistent, so that learning how to use one part of the system allows use of the entire system.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed:

1. In a system comprising a computing environment coupled to a capture device for capturing user position and providing a human-computer interface, the system further comprising a display displaying a graphical image, a method of facilitating user interaction with an area of the graphical image for the human-computer interface, comprising:
(a) generating a handle tied to the area of the graphical image;
(b) detecting, via a camera sensing user movement, engagement by the user with the handle generated in said step (a), said step (b) facilitated by simulating an attractive force around the handle pulling a cursor to the handle, engagement detected upon the cursor being pulled to the handle;

(c) receiving an indication of gesture by the user; and (d) performing an action on the area of the graphical image in response to said step (c).

2. The method of claim 1, said step (a) comprising the step of displaying the handle on the area of the graphical image.

3. The method of claim 1, said step (a) comprising the step of displaying the handle adjacent the area of the graphical image.

4. The method of claim 1, said step (a) comprising the step of integrating the handle into an object which is part of the area of the graphical image so that no separate handle is displayed apart from the object.

5. The method of claim 1, said step (a) comprising the step of displaying the handle as a circular graphical object of two or three dimensions.

6. The method of claim 1, said step (a) comprising the step of displaying the handle as a graphical object and further comprising the step (e) of changing an appearance of the handle on the display from said step (a) to said step (b) and from said step (b) to said step (c).

7. The method of claim 1, said step (a) of generating a handle associated with the area of the user interface comprising the step of associating a handle to the area based on an action to be performed on the area upon detection of a gesture performed by a user while engaging the handle.

8. The method of claim 1, further comprising the step (f) of displaying affordances associated with the handle indicating how a user may interact with the handle generated in said step (a).

9. In a computer system having a computing environment coupled to a capture device for capturing user position and coupled to a display, a human-computer interface comprising:

an action area on the display, the action area capable of at least one of performing an action and having an action performed on it;

a handle displayed on the display and associated with the action area, the handle providing an explicit engagement point with an action area and defining how a user may interact with the action area an attractive force simulated around the handle for pulling the cursor into engagement with the handle when the cursor is positioned a predetermined distance away from the handle; and rails displayed on the display associated with the handle for defining how a user may manipulate the handle.

10. The human-computer interface of claim 9, wherein the action area is a navigation menu and the handle defines navigation paths through the navigation menu.

11. The human-computer interface of claim 10, wherein the navigation menu is a textual menu.

12. The human-computer interface of claim 10, wherein the navigation menu is a graphical menu.

13. The human-computer interface of claim 9, wherein a simulated force is generated around the handle to make engagement with the handle by a user easier to establish.

* * * * *